(12) United States Patent
Huang et al.

(10) Patent No.: US 8,050,692 B2
(45) Date of Patent: Nov. 1, 2011

(54) METHOD FOR IMPROVING PAGING SPEED OF A CALLED USER IN CDMA TRUNKING SYSTEM

(75) Inventors: Chi Huang, Shenzhen (CN); Mengjiao Ding, Shenzhen (CN); Jinlong Liu, Shenzhen (CN)

(73) Assignee: ZTE Corporation (CN)

( * ) Notice: Subject to any disclaimer, the term of this patent is extended or adjusted under 35 U.S.C. 154(b) by 755 days.

(21) Appl. No.: 12/097,810

(22) PCT Filed: Dec. 26, 2005

(86) PCT No.: PCT/CN2005/002310
§ 371 (c)(1),
(2), (4) Date: Aug. 7, 2008

(87) PCT Pub. No.: WO2007/073612
PCT Pub. Date: Jul. 5, 2007

(65) Prior Publication Data
US 2008/0317144 A1    Dec. 25, 2008

(51) Int. Cl.
*H04W 68/00* (2009.01)
(52) U.S. Cl. ............. 455/458; 455/426.1; 455/434; 455/450; 455/561; 455/550.1; 370/340; 370/324; 370/503; 370/341; 375/260
(58) Field of Classification Search ............ 455/458, 455/423, 434, 67.11, 67.13, 115.1, 455, 518–520, 455/553.1; 370/311, 324, 503
See application file for complete search history.

(56) References Cited

U.S. PATENT DOCUMENTS

| | | | | | |
|---|---|---|---|---|---|
| 4,467,140 A | * | 8/1984 | Fathauer et al. | ............ | 455/462 |
| 4,737,979 A | * | 4/1988 | Hashimoto | .............. | 379/82 |
| 4,912,757 A | * | 3/1990 | Ossandon | ............... | 379/217.01 |
| 4,980,907 A | * | 12/1990 | Raith et al. | .............. | 455/465 |
| 5,243,645 A | * | 9/1993 | Bissell et al. | .......... | 379/211.02 |
| 5,311,570 A | * | 5/1994 | Grimes et al. | ............. | 455/417 |
| 5,479,408 A | * | 12/1995 | Will | ............................ | 370/313 |
| 5,486,814 A | * | 1/1996 | Quinones | .................. | 340/573.6 |

(Continued)

FOREIGN PATENT DOCUMENTS

CN    1567786    1/2005

(Continued)

*Primary Examiner* — Nick Corsaro
*Assistant Examiner* — Babar Sarwar
(74) *Attorney, Agent, or Firm* — Connolly Bove Lodge & Hutz LLP

(57) ABSTRACT

The present invention discloses a method for improving paging speed of a called user in CDMA trunking system. For a first trunking terminal supporting minus time slot call manner, said method includes: it makes minus time slot paging cycles of the first trunking terminal and a trunking core network keep synchronous; the first trunking terminal selects a minus time slot paging cycle to calculate a paging time slot according to the presence of its own minus time slot paging cycle and the presence of a minus time slot paging cycle contained in an overhead message of a call channel, and monitors the call channel on the calculated paging time slot; the base station system selects a minus time slot paging cycle to calculate a paging time slot of the user according to the presence of its own minus time slot paging cycle and the presence of a minus time slot paging cycle contained in a paging request message, and transmits a paging message on the call channel according to the calculated paging time slot. The method of the present invention effectively shortens the duration of establishment of a trunking call, and simultaneously maintains the compatibility for the existing trunking terminals.

15 Claims, 3 Drawing Sheets

U.S. PATENT DOCUMENTS

| | | | |
|---|---|---|---|
| 6,639,907 B2 * | 10/2003 | Neufeld et al. | 370/342 |
| 6,687,285 B1 * | 2/2004 | Jou | 375/133 |
| 6,711,413 B1 * | 3/2004 | Heidari | 455/515 |
| 2002/0142784 A1 * | 10/2002 | Abrishamkar et al. | 455/458 |
| 2003/0008691 A1 * | 1/2003 | Chen et al. | 455/574 |

FOREIGN PATENT DOCUMENTS

| | | |
|---|---|---|
| CN | 1567793 | 1/2005 |
| CN | 1585526 | 2/2005 |
| EP | 1768423 A1 | 3/2007 |

\* cited by examiner

… (US 8,050,692 B2)

METHOD FOR IMPROVING PAGING SPEED OF A CALLED USER IN CDMA TRUNKING SYSTEM

RELATED APPLICATIONS

This application is a national stage application (under 35 U.S.C. §371) of PCT/CN2005/002310, filed Dec. 26, 2005.

TECHNICAL FIELD

The present invention relates to a method for achieving quick access in a code division multiple access trunking system, which is a method for improving call establishing speed in the digital trunking field based on CDMA (Code Division Multiple Access) technology, more specifically, relates to a method for improving the paging responding speed of a called user.

BACKGROUND ART

Trunking communication is an important branch of wireless communication, which is mainly used in the field of professional mobile communication. The most important character of trunking communication is that the voice communication is performed in a manner of half-duplex, connected in a manner of push to talk, wherein the called user may answer the call without off-Hook, and a high connection speed is demanded. Out of optimization on trunking communication markets, digital trunking communication systems developed by communication manufacturers has come into entering this field, and relevant standards are issued one after another, and national standards for trunking communication develop in a "trunking" state in a period of time.

In a trunking communication system based on CDMA, CDMA technology is combined with a private scheduling communication system, and the communication manner of half-duplex is adopted, so that a quick connection can be carried out and group call, viz. one-to-many call manner is supported. Thus, it not only develops the services of cellular communication systems, but also debarrasses the private dispatching communication system from its limit in function and area.

As a professional trunking system, the most important difference from the traditional cellular communication lies in its high capacity and quick access. In a CDMA cellular system, the called user is paged by a manner of time slot. After the handset is power on, a time slot is calculated in accordance with IMSI to monitor a paging channel; when the system is to page a user, also a time slot (which is the same as the time slot for the monitor of the system terminal) is calculated in accordance with IMSI of said user, and a paging message is sent on said time slot, so that paging to the user is carried out. The smallest paging time slot cycle in existing CDMA systems is 0 (viz. 1.28 seconds), which leads to conceivable long paging time for some users and is far from meeting the requirement of quick access of the trunking system. Although a concept of the minus time slot is suggested in IS2000 R1sD protocol, it is merely corresponding to common voice call and simultaneously without support from trunking terminals or systems. Thus, the minus time slot paging cycle needs to be supported in the trunking system, so as to shorten the paging time of a trunking call and meet the requirements of trunking.

Furthermore, during used in existing R1s0 or R1sA systems, the minus time slot paging cycle should not only be usable in existing trunking terminals but also be usable in old trunking terminals. Furthermore, common voice calls and trunking functions of other trunking terminals not supporting the minus time slot should not be influenced. However, the paging time slot in the prior art is synchronized from trunking terminals to the system and cannot carry out compatibility of the old trunking terminals. Hence, the synchronizing mode needs to be changed to realize compatibility of all the trunking terminals.

SUMMARY OF THE INVENTION

The object of the present invention is to provide a method for improving paging speed of a called user in a code division multiple access trunking system, which shortens the duration for establishing a trunking call, particularly for paging the called user under the precondition that the existing network user is not influenced and the trucking terminal standby duration is not influenced greatly, to solve the most important problem of the duration for call establishment in the trunking system.

To achieve the above mentioned object, the present invention provides a method for improving paging speed of a called user in a code division multiple access trunking system, wherein for a first trunking terminal supporting minus time slot paging manner, the method comprises the following steps:

a minus time slot paging cycle synchronizing step, in which it makes minus time slot paging cycles saved by the trunking terminal and a trunking core network keep synchronous;

a system paging message monitoring step, in which the trunking terminal decide a minus time slot paging cycle between the presence of its own minus time slot paging cycle and the presence of a minus time slot paging cycle contained in an overhead message of a call channel and calculate a paging time slot, and monitors the call channel on the calculated paging time slot;

a paging step, in which the base station system decide a minus time slot paging cycle to calculate a paging time slot of the user according to the presence of its own minus time slot paging cycle and the presence of a minus time slot paging cycle contained in a paging message from core network, and transmits a paging message on the call channel according to the calculated paging time slot.

In the minus time slot paging cycle synchronizing step of the above mentioned method, a trunking core network apparatus performs the paging in accordance with paging information before the synchronization when a trunking call is performed in the case of a failure of the synchronization.

In the above mentioned method, the minus time slot paging cycle synchronizing step specifically comprises the following steps:

Step 11, in which the trunking system core network initiates the synchronization of minus time slot paging cycle with the trunking terminal;

Step 12, in which the trunking core network apparatus sends minus time slot cycle information to the trunking terminal via air interface, the trunking terminal saves related information and simultaneously sets its own minus time slot cycle information to be effective, and sends a Ack message to the trunking core network apparatus;

Step 13, in which the trunking core network apparatus judges whether the recognizing message of successful synchronization update is received, the flow is ended in the case of a successful update, and the flow turns to Step 14 for processing in the case of an unsuccessful update;

Step 14, in which the trunking core network apparatus sets an update-failed flag bit, if a trunking call is performed, the trunking core network apparatus performs the paging in accordance with the paging information before the synchronization when paging the trunking terminal.

In the Step 11 of the above mentioned method, the trunking core network apparatus initiates a synchronization update flow of minus time slot paging cycle information with the trunking terminal when the trunking system core network accepts user registration this time in the case where the trunking system core network adds time slot paging cycle information for the user, the minus time slot cycle information varies, or the previous synchronization with the first trunking terminal is unsuccessful.

In the system paging message monitoring step of the above mentioned method, when both the minus time slot paging cycle saved by the first trunking terminal and the minus time slot paging cycle contained in the overhead message of the call channel are present, the first trunking terminal calculates the paging time slot with the smaller value there-from; when only one of the minus time slot paging cycle saved by the first trunking terminal and the minus time slot paging cycle contained in the overhead message of the call channel is present, the first trunking terminal calculates the paging time slot with the minus time slot paging cycle which is present; when neither a minus time slot paging cycle is saved by the first trunking terminal nor a minus time slot paging cycle is contained in the overhead message of the call channel, the first trunking terminal calculates the paging time slot in accordance with IS2000 protocol.

In the above mentioned method, the system paging message monitoring step specifically comprises the following steps:

Step 21, in which the first trunking terminal monitors the paging channel and receives the overhead message over paging channel after being on startup and having acquired a pilot channel and synchronization channel;

Step 22, in which the trunking terminal judges whether information containing minus time slot cycle is acquirable on the paging channel, and it turns to Step 23 for processing in the case of acquirable, else, turns to Step 24 for processing;

Step 23, in which the first trunking terminal judges whether itself has saved the minus time slot cycle information synchronized from the trunking core network apparatus, and it turns to Step 25 for processing in the case of having saved, else, turns to Step 26 for processing;

Step 24, in which the first trunking terminal judges whether itself has saved the minus time slot cycle information synchronized from the trunking core network apparatus, and it turns to Step 27 for processing in the case of having saved, else, calculates the paging time slot in accordance with IS2000 protocol, and it turns to Step 28 for processing;

Step 25, in which the first trunking terminal calculates a paging time slot with the smaller value of the minus time slot paging cycle saved by itself and the minus time slot paging cycle contained in the overhead message, and it turns to Step 28 for processing;

Step 26, in which the trunking terminal calculates the paging time slot with the minus time slot paging cycle contained in the overhead message, and it turns to Step 28 for processing;

Step 27, in which the trunking terminal calculates the paging time slot with the minus time slot paging cycle saved by itself, and it turns to Step 28 for processing;

Step 28, in which the trunking terminal waits for being woke up by a message on the paging channel based on the calculated paging time slot.

In the user paging step in the above mentioned method, the base station system calculates the paging time slot of the user with the smaller value of the minus time slot paging cycle allocated by itself and the minus time slot cycle contained in the paging request message when the paging request message contains the minus time slot cycle information; the base station system calculates the paging time slot of the user with minus time slot paging cycle allocated by itself when the paging request message does not contain the minus time slot cycle information.

In the above mentioned method, the user paging step specifically comprises the following steps:

Step 31, in which the base station system receives the paging message sent from the trunking core network apparatus and starts a paging processing flow;

Step 32, in which the base station system judges whether the paging message contains information informing that the trunking terminal supports minus time slot, and it turns to Step 33 for processing in the case of containing, else, turns to Step 34 for processing;

Step 33, in which the base station system calculates the paging time slot with the smaller value of the time slot paging cycle contained in the paging message and the max time slot paging cycle parameter configuration of the base station, and it turns to Step 35;

Step 34, in which the base station system calculates the paging time slot with its own minus time slot paging cycle, and it turns to Step 35;

Step 35, in which the base station system sends the paging message on the paging channel in accordance with the calculated paging time slot.

The method of the present invention, in which the base station system and the trunking terminal respectively calculate the paging time slot with the smaller time slot after the minus time slot paging cycles saved by the trunking terminal and the trunking core network are kept in synchronization under the precondition that the existing network user is not influenced and the trunking standby duration is not influenced greatly, has effectively shortened the duration of trunking call establishment especially the duration of the paging of the called user, solved the most important problem of long duration of call establishment in a trunking system, and simultaneously maintains the compatibility for the existing trunking terminals.

MODES OF CARING OUT THE INVENTION

Figure 1:
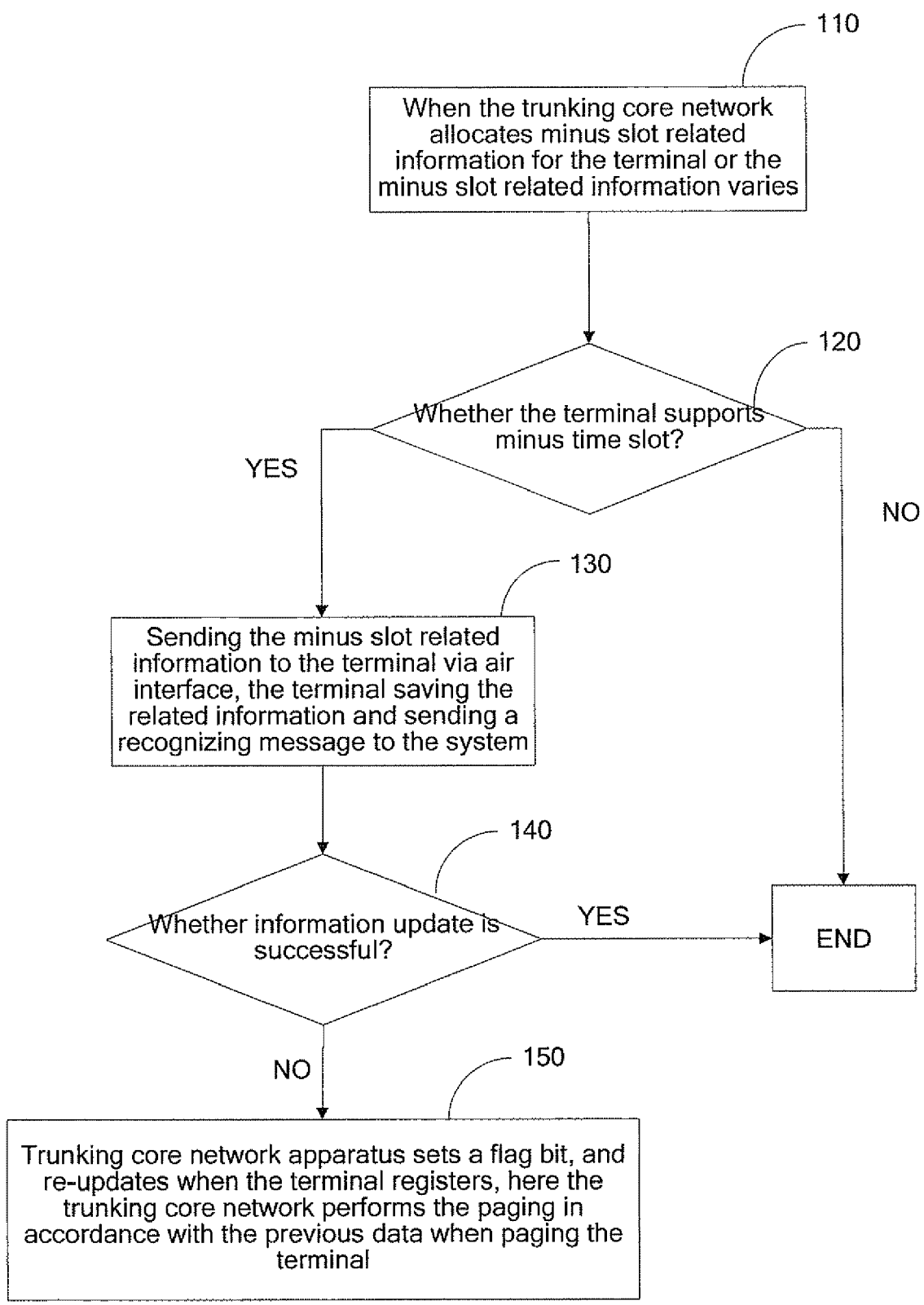
FIG. 1 is a flow chart of the minus time slot cycle information synchronizing step in the present invention.

The mode of carrying out the technical solution is described in detail in combination of the figures in the following:

According to IS2000 protocol, paging channels in CDMA systems are divided into different 80 ms time slots, and the paging channels are monitored only on certain assigned slots by mobile phones in slot monitoring mode. A trunking terminal working in a time slot mode usually monitors one or two time slots of the paging channel in each time slot cycle. The time slot cycle length is T in a unit of 1.28 s and may be determined by the following formula:

$$T=2^i$$

Wherein i is an selected time slot cycle index (the minimum value thereof is fixed as 0 in RLS0 of IS2000 protocol, that means the minimum value of T is 1.28 s, and when i takes a minus value, T may take a smaller value, this is just the so-called minus time slot cycle).

In order to determine an allocated time slot, the trunking terminal hashes IMSI with a Hash Function to select a number PGSLOT from 0~2047, so the number of time slots of the trunking terminal is determined by the following formula:

$$\{[t/4]-PGSLOT\} \bmod (16 \times T)=0.$$

It can be seen from the above formula, in the case where IMSI is determined, when T takes different values, proposed T1, T2, wherein T2=n×T1 and there is a multiple-relation between 16×T1 and 16×T2, so it is certain that a number dividable exactly by 16×T2 can also be divided exactly by 16×T1. Thus, it is certain that a monitoring time slot with large time slot cycle can be monitored in a small time slot cycle, while it is untenable in the contrary.

In the method for improving paging speed of the called user in code division multiple access trunking system according to the present invention, corresponding minus time slot cycle information is saved respectively in the trunking terminal, the base station system and the trunking scheduling core network. Wherein the base station saves the largest paging time slot cycle supported by the system, which is used for base station paging and inconsistent with those saved by the other two nodes, while the minus time slot paging cycles saved in the trunking terminal and the trunking core network are paging time slot cycle supported by the trunking terminal and need to be maintained in synchronization.

The method for improving paging speed of the called user in code division multiple access trunking system according to the present invention comprises the following steps:

Step one, in which the trunking core network apparatus performs synchronization update of minus time slot paging cycle information when it finds that minus time slot paging cycle information is allocated to the user or the minus time slot paging cycle information varies;

said synchronization update is performed only to the trunking terminals supporting minus time slot paging cycle, and the result of the synchronization need to be recognized, the user is paged still in accordance with the time slot paging cycle information before the synchronization in the case where the synchronization update is unsuccessful, and it is judged whether synchronization update needs to be performed again when the user registers next time;

Step two, in which after the trucking terminal is on startup and has captured a pilot and synchronization channel, if the system and the king terminal support minus time slot, the trunking terminal calculates a paging time slot in accordance with the minus time slot paging cycle in the manner of taking a mod, and monitors the paging channel on said time slot;

said paging time slot is obtained by calculating with different selected minus time slot paging cycle based on the presence of the minus time slot paging cycles in the trunking terminal and in the overhead message of the paging channel, and comprises the following circumstances:

If the trunking terminal has received minus time slot paging cycle information on the overhead message of the paging channel and the trunking terminal itself has saved the minus time slot paging cycle information, the trunking terminal calculates the paging time slot with the smaller value of the two.

If the trunking terminal has received the minus time slot paging cycle information on the overhead message of the paging channel while the trunking terminal itself has not saved the minus time slot paging cycle information, the trunking terminal calculates the paging time slot with the minus time slot paging cycle information on the overhead message of the paging channel. If the trunking terminal has not received the minus time slot paging cycle information on the overhead message of the paging channel while the trunking terminal itself has saved the minus time slot paging cycle information, the trunking terminal calculates the paging time slot with the minus time slot paging cycle information saved by itself;

If the trunking terminal has neither received the minus time slot paging cycle information on the overhead message of the paging channel nor saved the minus time slot paging cycle information by itself, the trunking terminal monitors a message on the system paging channel in a manner under IS2000 protocol;

Step three, in which, when a trunking call is being established, the base station calculates a time slot in accordance with the minus time slot paging cycle information in the paging request message in the manner of taking a mod after having received the paging request message sent from the trunking core network, and pages the user on said time slot;

said paging time slot is obtained by calculating with different selected minus time slot paging cycle based on the presence of the minus time slot paging cycles in the base station and in the paging request message, and comprises the following two circumstances:

the base station calculates the paging time slot of the user with the smaller value of the minus time slot paging cycle contained in the paging message and the largest minus time slot paging cycle supported by the base station if the trunking terminal supports the minus time slot paging manner and the paging request message contains the minus time slot paging cycle; the base station calculates the paging time slot of the user with the largest minus time slot paging cycle supported by itself if the paging message does not contain the minus time slot paging cycle;

the base station calculates the paging time slot of the user in a manner under IS2000 if the trunking terminal does not support the minus time slot paging manner.

FIG. 1 is a flow chart that the trunking core network and trunking terminal in a trunking system based on code division access performs the minus time slot cycle information synchronizing step, comprising the following steps:

Step 110, in which the trunking core network apparatus initiates a flow of synchronization update of minus time slot paging cycle information with the trunking terminal when the trunking system core network accepts user registration this time in the case where the trunking system core network adds time slot paging cycle information for a certain user, the minus time slot cycle information varies, or the previous synchronization is unsuccessful;

Step 120, in which it is judged whether the trunking terminal to be synchronized supports the minus time slot cycle (whether the trunking terminal supports the minus time slot paging cycle can be determined by judging the protocol version number of the trunking terminal), the flow is ended if the trunking terminal does not support the minus time slot; the flow of synchronization update is continued if the trunking terminal supports the minus time slot, and the flow turns to Step 130 for processing;

Step 130, in which the trunking core network apparatus sends the minus time slot information in a manner such as SDB to the trunking terminal via an air interface, the trunking terminal saves related information and simultaneously sets its own minus time slot information to be effective, and simultaneously sends a recognizing message to the system to insure the reliability of the synchronization;

Step 140, in which the trunking core network apparatus judges whether the recognizing message of successful synchronization update is received, the flow is ended in the case of a successful update, failure handling needs to be performed in the case of an unsuccessful update and the flow turns to Step 150 for processing;

Step 150, in which the trunking core network apparatus sets the update-failed flag bit in the case of a failed update, judges based on information reported from the trunking terminal whether the update needs to be performed again when the trunking terminal registers (step 110), and the trunking core network apparatus performs the paging in accordance with the paging information before the synchronization when pages the trunking terminal, if here a trunking call is to be performed.

Figure 2:
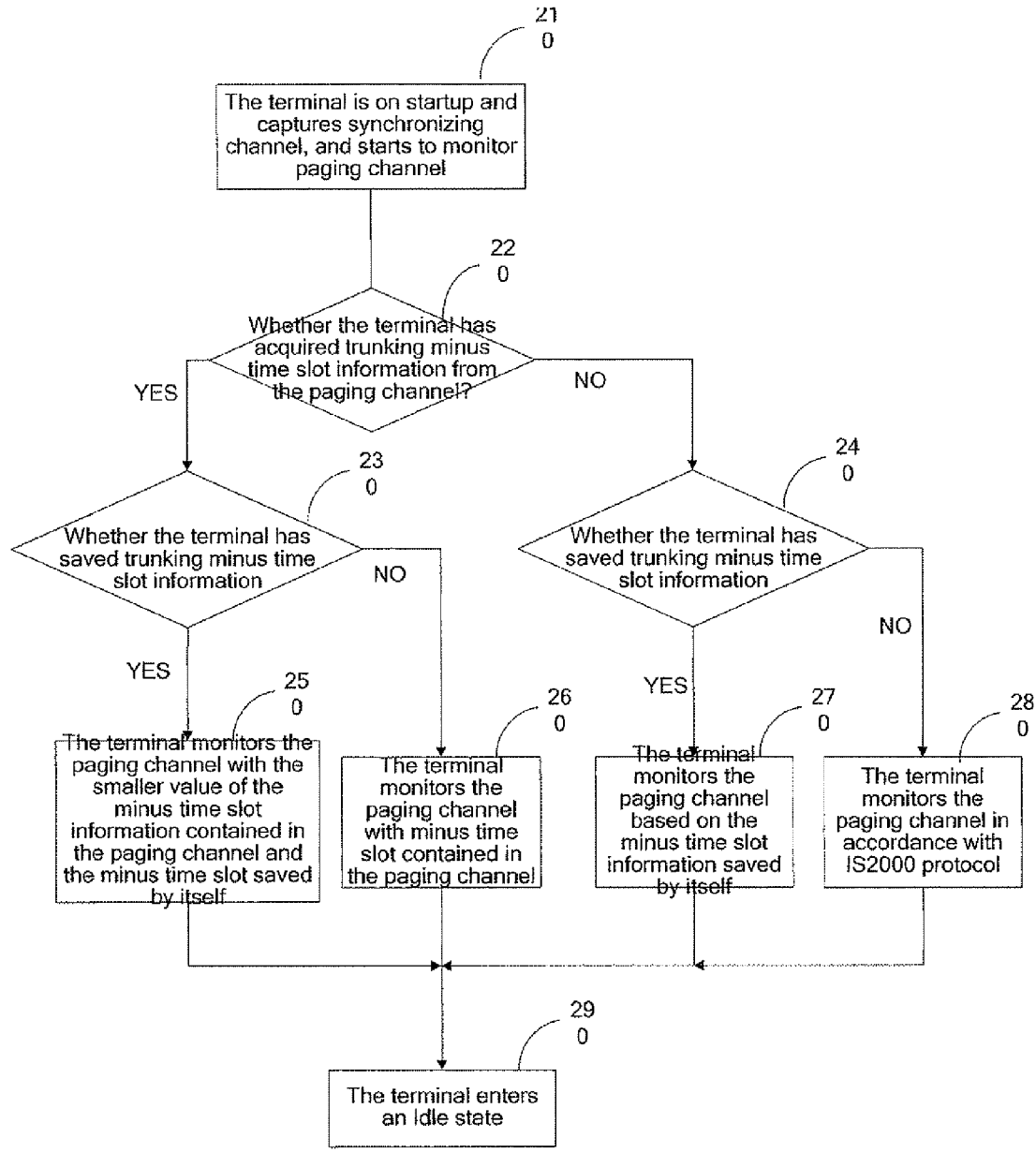
FIG. 2 is a flow chart that the trunking terminal monitors the system paging message after being on startup according to the present invention.

FIG. 2 shows a flow chart that the trunking terminal supporting minus time slot paging cycle in the trunking system of CDMA standard monitors the system paging message after being on startup according to the present invention, specifically comprising the following steps:

Step 210, in which the trunking terminal supporting the minus time slot begins to monitor the paging channel and receive the overhead message of the paging channel, such as system parameter message after being on startup and having captured the pilot synchronization channel;

Step 220, in which the trunking terminal judges whether the minus time slot related information is contained in the received overhead message on the paging channel, if it is not contained therein, the trunking terminal marks that the base station system does not use the minus time slot, while the trunking terminal may still use the minus time slot, then it turns to Step 230 for processing, else, it turns to Step 240 for processing;

Step 230, in which the trunking terminal judges whether the trunking terminal has saved the minus time slot information synchronized from the trunking core network apparatus, it turns to Step 250 for processing in the case of having saved, else, it turns to Step 260 for processing;

Step 240, in which the trunking terminal judges whether the trunking terminal has saved the minus time slot information synchronized from the trunking core network apparatus, and it turns to Step 270 for processing in the case of having saved, else, it turns to Step 280 for processing;

Step 250, in which the trunking terminal calculates the time slot, wherein it calculates the time slot with the smaller value of the minus time slot paging cycle saved in the trunking terminal and the minus time slot paging cycle contained in the system overhead message, on which the trunking terminal should monitor the paging message of the system, and it turns to Step 290;

Step 260, in which the trunking terminal calculates the time slot, wherein it calculates the time slot with the minus time slot paging cycle contained in the system overhead message, on which the trunking terminal should monitor the message on the paging channel of the system, and it turns to Step 290;

Step 270, in which the trunking terminal calculates the time slot, wherein it calculates the time slot with the minus time slot paging cycle saved in the trunking terminal, on which the trunking terminal should monitor the paging message of the system, and it turns to Step 290;

Step 280, in which the trunking terminal monitors the message on the paging channel of the system in a manner under IS2000 protocol, and it turns to Step 290;

Step 290, in which the trunking terminal turns into an Idle state and waits for being woke up by the message on the paging channel after having received all the necessary overhead messages.

Figure 3:
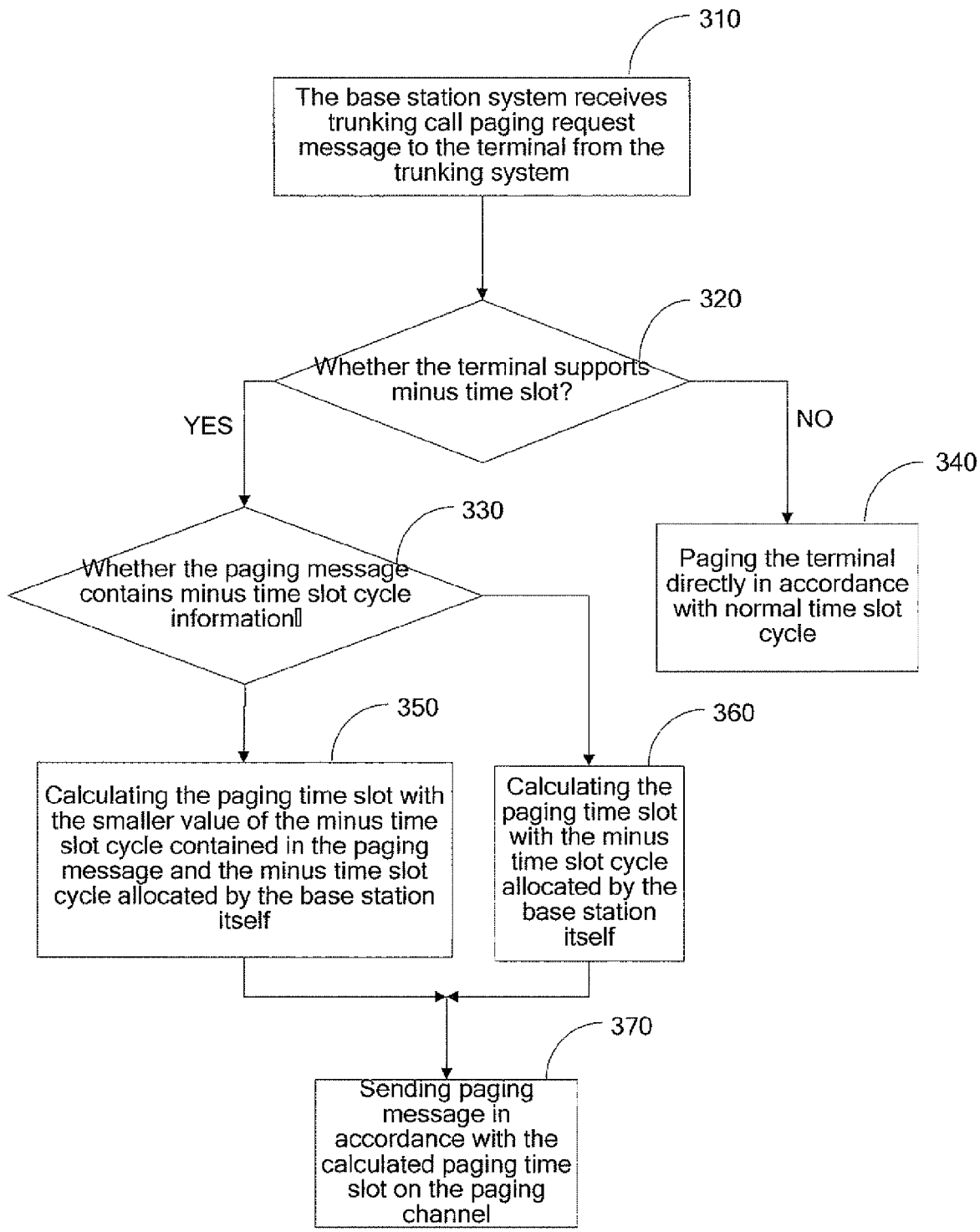
FIG. 3 is a flow chart that the base station system pages a trunking terminal in a trunking call.

FIG. 3 is a flow chart that the base station system pages the trunking terminal in a trunking call, specifically comprising the following steps:

Step 310, in which the base station system receives the paging request message sent from the trunking core network apparatus and starts a paging processing flow at the beginning of the trunking call;

Step 320, in which the base station system judges whether the trunking terminal supports the paging manner of minus time slot paging cycle (for instance: it may be judged based on the protocol version number of the trunking terminal contained in the paging request message), it turns to Step 330 for paging processing in the manner of minus time slot in the case where the trunking terminal supports the paging manner of minus time slot paging cycle, and it turns to Step 340 for processing in the case where it does not support the same;

Step 330, in which the base station system further judges whether the paging request message contains information informing that the trunking terminal supports the minus time slot, and it turns to Step 350 for processing in the case of containing, else, it turns to Step 360 for processing;

Step 340, in which the base station pages the trunking terminal in a manner under IS2000 protocol in the case where the trunking terminal does not support the paging manner of minus time slot cycle;

Step 350, in which the base station system performs paging time slot calculation, wherein it calculates the paging time slot with the smaller value in the minus time slot paging cycle contained in the paging message and the minus time slot paging cycle allocated by the base station itself, and it turns to Step 370 for processing in accordance with the result of the calculation;

Step 360, in which the base station system performs paging time slot calculation, wherein it calculates the paging time slot with the minus time slot paging cycle allocated by the base station itself, and it turns to Step 370 for processing in accordance with the result of the calculation;

Step 370, in which the base station system sends the paging message on the paging channel in accordance with the calculated paging time slot (in the manner according to Step 350 or Step 360).

Of course, this invention can be implemented with a variety of other cases, those skilled in the art can make any amendment or equivalent replacement without diverting from the spirit and essence of this invention, but the corresponding changes of this invention should be within the scope of protection required in the claims of the present invention.

INDUSTRIAL APPLICABILITY

The method of the present invention, in which the base station system and the trunking terminal respectively calculate the paging time slot with the smaller time slot after the minus time slot paging cycles saved by the trunking terminal and the trunking core network are kept in synchronization under the precondition that the existing network user is not influenced and the trunking standby duration is not influenced greatly, has effectively shortened the duration of trunking call establishment especially the duration of the paging of a called user, solved the most important problem of long duration of call establishment in a trunking system, and simultaneously maintains the compatibility for the existing trunking terminals.

What is claimed is:

1. A method for improving paging speed of a called user in a code division multiple access trunking system characterized in that, for a trunking terminal supporting minus time slot paging manner, comprises the following steps:

a minus time slot paging cycle synchronizing step, in which minus time slot paging cycles saved by the trunking terminal and a trunking core network are kept synchronous; a system paging channel monitoring step, in which the trunking terminal decides a time slot paging cycle to calculate a paging time slot according to the presence of its own minus time slot paging cycle and a presence of a minus time slot paging cycle contained in an overhead message of a call channel and monitors the paging channel on the calculated paging time slot; and a user paging step, in which base station system selects a time slot paging cycle to calculate a paging time slot of the user according to the presence of its own minus time slot paging cycle and the presence of a minus time slot paging cycle contained in a paging message, and transmits a paging message on the paging channel according to the calculated paging time slot.

2. The method according to claim 1, wherein, in the minus time slot paging cycle synchronizing step, a trunking core network apparatus performs the paging in accordance with paging information before the synchronization when a trunking call is performed in the case of a failure of the synchronization.

3. The method according to claim 2, wherein, the minus time slot paging cycle synchronizing step specifically comprises the following steps:

a step denominated Step 11 in which the trunking system core network initiates the synchronization of minus time slot paging cycle with the trunking terminal;

a step denominated Step 12 in which the trunking core network apparatus sends minus time slot information to the trunking terminal via an air interface, the trunking terminal saves related information and simultaneously sets its own minus time slot information to be effective, and sends a recognizing message to the trunking network apparatus;

a step denominated Step 13 in which the trunking core network apparatus judges whether the recognizing message of successful synchronization update is received, the flow is ended in the case of a successful update, and the flow turns to Step 14 for processing in the case of an unsuccessful update; and a step denominated Step 14 in which the trunking core network apparatus sets an update-failed flag bit, if a trunking call is performed, the trunking core network apparatus performs the paging in accordance with the paging information before the synchronization when paging the first trunking terminal.

4. The method according to claim 3, wherein, in the Step 11, the trunking core network apparatus initiates a synchronization update flow of minus time slot paging cycle information with the trunking terminal when the trunking system core network accepts user registration this time in the case where the trunking system core network adds time slot paging cycle information for the user, the minus time slot cycle information varies, or the previous synchronization with the first trunking terminal is unsuccessful.

5. The method according to claim 3 wherein, in the user paging step, the base station system calculates the paging time slot of the user with the smaller value of the minus time slot paging cycle allocated by itself and the minus time slot cycle contained in the paging request message when the paging message contains the minus time slot cycle information; the base station system calculates the paging time slot of the user with the minus time slot paging cycle allocated by itself when the paging message does not contain the minus time slot cycle information.

6. The method according to claim 5, wherein, the user paging step specifically comprises the following steps:

a step denominated Step 31, in which the base station system receives the paging message sent from the trunking core network apparatus and starts a paging processing flow;

a step denominated Step 32, in which the base station system judges whether the paging message contains information informing that the trunking terminal supports minus time slot, and it turns to Step 33 for processing in the case of containing, else, turns to Step 34 for processing;

a step denominated Step 33, in which the base station system calculates the paging time slot with the smaller value of the minus time slot paging cycle contained in the paging request message and the time slot paging cycle of the base station itself, and it turns to Step 35;

a step denominated Step 34, in which the base station system calculates the paging time slot with its own minus time slot paging cycle, and it turns to Step 35;

a step denominated Step 35, in which the base station system sends the paging message on the paging channel in accordance with the calculated paging time slot.

7. The method according to claim 1, characterized in that, in the system paging message monitoring step, when both the minus time slot paging cycle saved by the first trunking terminal and the minus time slot paging cycle contained in the overhead message of the paging channel are present, the first trunking terminal calculates the paging time slot with the smaller value there-from; when only one of the minus time slot paging cycle saved by the first trunking terminal and the minus time slot paging cycle contained in the overhead message of the call channel is present, the trunking terminal calculates the paging time slot with the minus time slot paging cycle which is present; when neither a minus time slot paging cycle is saved by the trunking terminal nor a minus time slot paging cycle is contained in the overhead message of the call channel, the first trunking terminal calculates the paging time slot in accordance with IS2000 protocol.

8. The method according to claim 7, wherein, the system paging message monitoring step specifically comprises the following steps:

a step denominated Step 21, in which the trunking terminal monitors the paging channel and receives the overhead message from paging channel after being on startup and having acquired pilot channel and synchronization channel;

a step denominated Step 22, in which the trunking terminal judges whether information containing minus time slot is acquirable on the paging channel, and it turns to Step 23 for processing in the case of acquirable, else, turns to Step 24 for processing;

a step denominated Step 23, in which the trunking terminal judges whether itself has saved the minus time slot information synchronized from the trunking core network apparatus, and it turns to Step 25 for processing in the case of having saved, else, turns to Step 26 for processing;

a step denominated Step 24, in which the trunking terminal judges whether itself has saved the minus time slot information synchronized from the trunking core network apparatus, and it turns to Step 27 for processing in the case of having saved, else, calculates the paging time slot in accordance with IS2000 protocol, and it turns to Step 28 for processing;

a step denominated Step 25, in which the trunking terminal calculates a paging time slot with the smaller value of the minus time slot paging cycle saved by itself and the time slot paging cycle contained in the overhead message, and it turns to Step 28 for processing;

a step denominated Step 26, in which the trunking terminal calculates the paging time slot with the minus time slot paging cycle contained in the overhead message, and it turns to Step 28 for processing;

a step denominated Step 27, in which the trunking terminal calculates a paging time slot with the minus time slot paging cycle saved by itself, and it turns to Step 28 for processing; and a step denominated Step 28, in which the trunking terminal waits for being woke up by a message on the paging channel based on the calculated paging time slot.

9. The method according to claim 8 wherein, in the user paging step, the base station system calculates the paging time slot of the user with the smaller value of the minus time slot paging cycle allocated by itself and the minus time slot cycle contained in the paging request message when the paging message contains the minus time slot cycle information; the base station system calculates the paging time slot of the user with the minus time slot paging cycle allocated by itself when the paging message does not contain the minus time slot cycle information.

10. The method according to claim 7 wherein, in the user paging step, the base station system calculates the paging time slot of the user with the smaller value of the minus time slot paging cycle allocated by itself and the minus time slot cycle contained in the paging request message when the paging message contains the minus time slot cycle information; the base station system calculates the paging time slot of the user with the minus time slot paging cycle allocated by itself when the paging message does not contain the minus time slot cycle information.

11. The method according to claim 1 wherein, in the user paging step, the base station system calculates the paging time slot of the user with the smaller value of the minus time slot paging cycle allocated by itself and the minus time slot cycle contained in the paging request message when the paging message contains the minus time slot cycle information; the base station system calculates the paging time slot of the user with the minus time slot paging cycle allocated by itself when the paging message does not contain the minus time slot cycle information.

12. The method according to claim 11, wherein, the user paging step specifically comprises the following steps:

a step denominated Step 31, in which the base station system receives the paging message sent from the trunking core network apparatus and starts a paging processing flow;

a step denominated Step 32, in which the base station system judges whether the paging message contains information informing that the trunking terminal supports minus time slot, and it turns to Step 33 for processing in the case of containing, else, turns to Step 34 for processing;

a step denominated Step 33, in which the base station system calculates the paging time slot with the smaller value of the minus time slot paging cycle contained in the paging request message and the time slot paging cycle of the base station itself, and it turns to Step 35;

a step denominated Step 34, in which the base station system calculates the paging time slot with its own minus time slot paging cycle, and it turns to Step 35; and a step denominated Step 35, in which the base station system sends the paging message on the paging channel in accordance with the calculated paging time slot.

13. The method according to claim 1, wherein, in the minus time slot paging cycle synchronizing step, the flow of the minus time slot paging cycle synchronizing step is directly ended in the case where it is judged that the trunking terminal does not support the minus time slot paging manner; and in the system paging message monitoring step and the user paging step, the monitoring of the message on the paging channel and the paging for a second trunking terminal are respectively performed in the manner as stipulated under IS2000 protocol.

14. The method according to claim 13, characterized in that, it is judged based on protocol version number of trunking terminal, whether the trunking terminal supports the minus time slot paging manner.

15. A method for improving paging speed of a called user in a code division multiple access thinking system for a first trunking terminal supporting minus time slot paging manner, comprising the following steps: a minus time slot paging cycle synchronizing step, in which minus time slot paging cycles made are saved by the first trunking terminal and a trunking core network keeps said cycles synchronous; a system paging channel monitoring step, in which the first trunking terminal decides a time slot paging cycle to calculate a paging time slot according to a presence of a minus time slot paging cycle of the first trunking terminal and to the presence of a minus time slot paging cycle contained in an overhead message of a call channel, and monitors the paging channel on the calculated paging time slot; and a user paging step, in which a base station system selects a time slot paging cycle to calculate a paging time slot of a user according to the presence of a minus time slot paging cycle of the base station system and to the presence of a minus time slot paging cycle contained in a paging message, and transmits a paging message on the paging channel according to the calculated paging time slot.

* * * * *